United States Patent [19]

Pipp, Jr. et al.

[11] Patent Number: 5,397,270

[45] Date of Patent: Mar. 14, 1995

[54] FLEX SHAFT COVER RETENTION DEVICE

[75] Inventors: Walter B. Pipp, Jr., Birmingham; Anthony K. Carman, Waterford, both of Mich.

[73] Assignee: ITT Corporation, New York, N.Y.

[21] Appl. No.: 54,187

[22] Filed: Apr. 28, 1993

[51] Int. Cl.$^6$ ............................................. F16C 1/02
[52] U.S. Cl. ............................................... 464/52
[58] Field of Search .................. 464/52, 73; 403/297, 403/280; 285/238, 239, 240, DIG. 30

[56] References Cited

U.S. PATENT DOCUMENTS

| | | | |
|---|---|---|---|
| 2,872,793 | 2/1959 | Botti . | |
| 3,221,746 | 12/1965 | Noble | 285/239 |
| 3,390,589 | 7/1968 | Tschanz . | |
| 3,686,896 | 8/1972 | Rutter . | |
| 3,711,130 | 1/1973 | Betzler . | |
| 3,785,752 | 1/1974 | Crespo | 417/319 |
| 4,126,920 | 11/1978 | Takahashi et al. | 29/243.52 |
| 4,126,928 | 11/1978 | Hoff | 29/445 |
| 4,335,585 | 6/1982 | Hoff | 464/52 |
| 4,392,836 | 7/1983 | Sugawara | 464/52 |
| 4,481,702 | 11/1984 | Mitchell | 403/297 |
| 4,735,442 | 4/1988 | Bürli | 285/238 |
| 4,747,799 | 5/1988 | Kato | 464/52 |
| 4,790,205 | 12/1988 | Stocker . | |
| 4,798,569 | 1/1989 | Alderfer | 285/239 |
| 4,891,034 | 1/1990 | Wilhelmsen | 464/87 |
| 4,964,839 | 10/1990 | Gloor | 464/52 |
| 5,005,875 | 4/1991 | Harle | 285/239 |
| 5,014,569 | 5/1991 | Kelley . | |
| 5,211,429 | 5/1993 | Charlson et al. | 285/238 |

FOREIGN PATENT DOCUMENTS

| | | |
|---|---|---|
| 0448195 | 9/1991 | European Pat. Off. . |
| 1382988 | 9/1963 | France . |
| 1400432 | 7/1975 | United Kingdom . |

OTHER PUBLICATIONS

Suhner, "Flexible Shafts For Transmission Of Rotary Power", Brochure, pp. 1–20, May 1984.
S. S. White Industrial Products, "Rotary Motion Flexible Shafts—Standards", Brochure, pp. 1–25, Jan. 1977.
S. S. White Industrial Products, "Rotary Motion Flexible Shafts—Technical Data", Brochure, pp. 1–33, Jan. 1977.
S. S. White Industrial Products, "Rotary Motion Flexible Shafts—Applications", Brochure, pp. 1–25, Jan. 1977.

*Primary Examiner*—Daniel P. Stodola
*Assistant Examiner*—Eileen A. Dunn
*Attorney, Agent, or Firm*—Robert P. Seitter; J. Gordon Lewis

[57] ABSTRACT

A flexible drive cable assembly includes a flexible elongated outer sheath enclosing a flexible elongated inner drive shaft. The drive shaft is connected to a driving element, such as a motor at one end, and to a driven element, such as a transmission at the opposite end. The flexible outer sheath is connected to the housing of the driving element at one end, and to the housing of the driven element at the opposite end, such that the outer sheath is held stationary in the longitudinal direction with respect to the inner drive shaft and the two housings. The outer sheath is connected to the housing by an end fitting. The end fitting includes an elongated connector extending outwardly from the housing to an outer end. The connector has a longitudinally extending aperture for passage of a coupling end of the inner drive shaft for connection to the element disposed within the housing. The connector also includes at least one radially extending projection for engaging an inner surface of the outer sheath to hold the outer sheath stationary in the longitudinal direction with respect to the housing.

22 Claims, 3 Drawing Sheets

FLEX SHAFT COVER RETENTION DEVICE

FIELD OF THE INVENTION

The invention relates to flexible drive cables including a flexible elongate inner drive shaft, disposed within a flexible elongate outer sheath for transmitting rotary or linear movements where a flexible drive cable assembly is formed by attachment of an end fitting to one end of the outer sheath, the flexible drive cable assembly being held substantially immovably at that end by connection of the end fitting to a housing fixture, and more particularly, the invention relates to end fittings for flexible drive cable assemblies for the transmission of rotary movements in electric seat adjustment mechanisms, such as those used in automobiles.

BACKGROUND OF THE INVENTION

Flexible drive cable assemblies are commonly used in a variety of applications. One such application is for the transmission of rotary movements in an electric automobile seat adjustment mechanism. The present electric automotive seat adjustment mechanisms include a reversible rotary motor which is driven in response to activation of a switch by the vehicle occupant. The rotary movement of the reversible electric motor is transmitted through a flexible drive cable assembly to the seat adjustment mechanism which moves the various seat frame assembly members with respect to one another in response to the rotary movement transmitted through the flexible drive cable assembly.

The present flexible drive cable assemblies suffer from high failure rate during use, due to one end of the drive cable becoming unattached to the end fitting of the housing fixture for the transmission or the motor. In most instances, this disengagement is unintentional by the vehicle occupants and may go unnoticed until the next vehicle occupant actuation of the switch in an attempt to adjust the seat mechanism. Various activities can result in the unintended dislocation of the flexible drive cable from the end fitting of the housing fixture, such as storage of an article under the seat, or removal of a previously stored article, such as an umbrella, ice scraper, or other object. In such instances, the stored or retrieved article may push the flexible drive cable off from the end fitting, or may hook the flexible drive cable and pull the flexible drive cable off from the end fitting. In addition, dislocation of the flexible drive cable from the end fitting may also occur due to the placement of a foot of a rear seat vehicle occupant underneath the front seat in such a manner as to push, or hook the flexible drive cable and dislocate it with respect to the end fitting of the housing fixture.

In an attempt to overcome this disadvantage of the flexible drive cable assemblies, various manufacturers have adopted the use of extra parts, such as clips, rings or other retainers which may be installed during the assembly process to more positively lock and retain the flexible drive cable with respect to the end fitting of the housing fixture. Unfortunately, in many cases these additional parts, i.e., clips, rings or other retainers, are not installed, or not properly installed, during the installation process, which results in continued high failure rates during use.

Therefore, the present invention seeks to overcome the perceived problems and disadvantages of the present flexible drive cable assemblies. The present invention seeks to provide a low cost, positive attachment of the flexible shaft and cover to an end fitting, which may be integrally formed with the motor or transmission housing, or may be connected to the motor or transmission housing. The present invention also seeks to provide an easy to assemble device which does not require extra parts, such as clips, rings or retainers. In addition, the present invention seeks to provide an assembly that requires a high pull-off effort to disassemble.

SUMMARY OF THE INVENTION

The present invention includes a flexible coupling for rotary shafts in order to facilitate relative motion between the shafts and to enable torque to be transmitted between the shafts, even if the shafts are misaligned or disposed at angularly related rotational axes. The flexible coupling includes an elongated element for transmitting rotational torque and is made of a flexible material. The elongated element is sheathed within a flexible enclosure. The flexible enclosure is connected to a housing and is disposed stationary in the longitudinal direction with respect to the elongated element by an end fitting. The end fitting can include an elongated connector extending outwardly from the housing to an outer end. The elongated connector has a longitudinally extending aperture for passage of the flexible coupling. The connector also includes at least one radially extending projection means for engaging an inner surface of the flexible enclosure to hold the flexible enclosure stationary in the longitudinal direction with respect to the elongated element and the housing. The radially extending projection means can include at least one barb-like projection having a projection increasing in radial length with respect to an increasing longitudinal distance from the outer end for a predetermined longitudinal length and disposed at a predetermined longitudinal distance from the outer end. The barb-like projection allows insertion of the flexible enclosure over the elongated connector while providing resistance to removal of the flexible enclosure from the elongated connector. Various configurations of the barb-like projection can be provided, including a two barb-like projection configuration, a three barb-like projection configuration, a four barb-like projection configuration and a plurality of barb-like projection configuration more than four in number. The present invention may include multiple barb-like projections disposed longitudinally spaced from one another and/or angularly spaced from one another about the longitudinal axis of the elongated connector. In addition, the at least one radially extending projection means may include at least one cone-like projection having a projection increasing in radial length with respect to an increasing longitudinal distance from the outer end for a predetermined longitudinal distance and disposed at a predetermined distance from the outer end. The cone-like projection allowing insertion of the flexible enclosure over the elongated connector while providing resistance to removal of the flexible enclosure from the elongated connector. The present invention may include multiple cone-like projections disposed longitudinally spaced from one another along the external surface of the elongated connector. The present invention may also include a combination of the barb-like projections and cone-like projections.

The present invention is assembled by threading or sliding the elongated element of the flexible coupling through the longitudinally extending aperture in the elongated connector while the flexible enclosure sheathing the elongated element is forced over the external surface of the elongated connector to a position where the flexible enclosure or flex-shaft cover necks down to a reduced diameter after passing over the at least one radially extending projection means and is gripped by the at least one radially extending projection means to provide for high retention strength.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
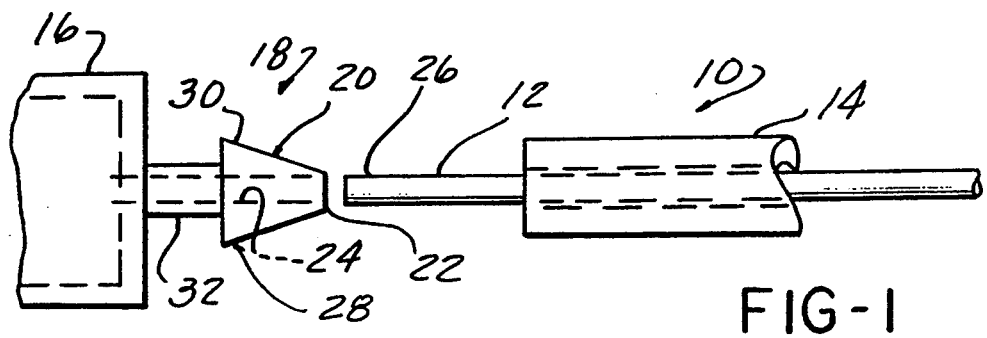
FIG. 1 is an exploded view of a flexible coupling assembly according to the present invention.

The present invention includes a flexible drive cable 10 including a flexible elongate inner drive shaft 12 disposed within a flexible elongate outer sheath 14. The function of a flexible shaft is to transmit rotary power or motion from a driving element through a curved path to the element to be driven. A flexible shaft consists of a flexible core or inner drive shaft 12, a protective outer casing or sheath 14 and end couplings to connect to the driving element and the driven element. The casing or sheath 14 supports the rotating core or shaft 12 and acts as a bearing surface at the same time. Flexible shafts are typically used to drive instrumentation (such as counters, speedometers or odometers), as power drive shafts in general machinery (such as for grinding, drilling and milling machines, packing machinery, printing machinery) or in portable power tools (such as screw drivers, grinders and concrete vibrators), and as remote control shafts for mechanical remote control of valves, flow controls and power seats. In remote control applications, the flexible shafts are used where extremely high torque at low RPM has to be transmitted. Torsional deflection typically is required to be low and roughly the same magnitude in either operating direction, The flexible drive cable 10 facilitates relative motion between two rotary elements and enables torque to be transmitted between the elements, even if the elements are misaligned or disposed at angularly related rotational axes. The flexible drive cable 10 includes a flexible elongate inner drive shaft 12 for transmitting rotational torque. The flexible elongate inner drive shaft 12 is made of a flexible material. The inner drive shaft 12 is sheathed within a flexible elongate outer sheath or enclosure 14. The flexible drive cable 10 is connected to a housing or fixture 16 through an end fitting 18, in a manner such that the flexible outer sheath 14 is disposed stationary in the longitudinal direction with respect to the inner drive shaft 12. The connection between the flexible drive cable 10 and the housing 16 is preferably made by an end fitting 18. The end fitting 18 may be formed integrally with the housing or fixture 16, or alternatively may be formed separately and adapted to be engaged with a separate housing or fixture 16.

Figure 2:
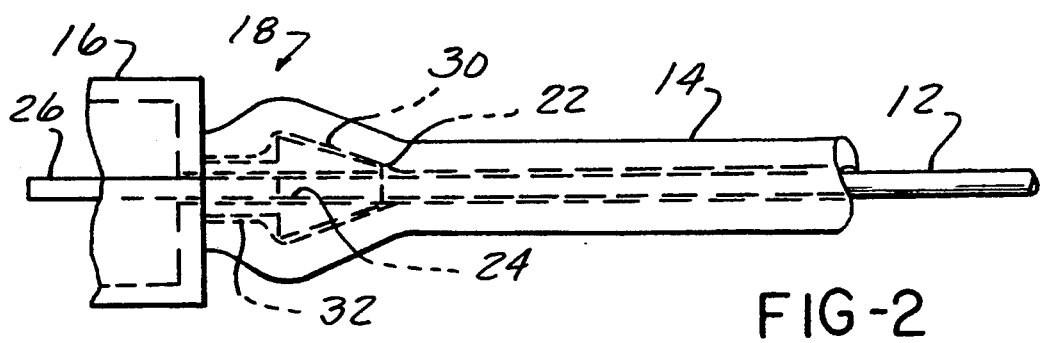
FIG. 2 is an assembled view of the flexible coupling assembly.
Figure 4:
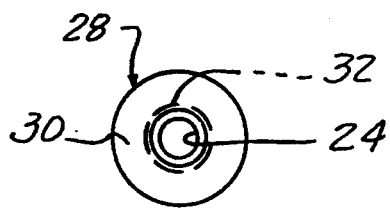
FIG. 4 is a top view of the end fitting shown in FIG. 3.

The end fitting 18 in its simplest form includes an elongated connector 20 extending outwardly from the housing 16 to an outer end 22. The elongated connector 20 has a longitudinally extending aperture 24 for passage of the coupling end 26 of the flexible drive cable 10 for connection to a drive element, such as a motor (not shown) or to a driven element, such as a transmission (not shown). The coupling end 26 of the flexible drive cable 10 is operably engaged with either the drive element or driven element as is appropriate for the particular housing 16. The elongated connector 20 also includes at least one radially extending projection means 28 for engaging an inner surface of the flexible elongate outer sheath 14 to hold the sheath 14 stationary in the longitudinal direction with respect to the inner drive shaft 12 and housing 16. The flexible drive cable 10 is attached to the elongated connector 20 with the inner drive shaft 12 passing through the longitudinally extending aperture 24, while the outer sheath 14 expands over the projection means 28 and then necks down to overlay a reduced diameter neck portion 32 adjacent the housing 16 as best seen in FIG. 2.

In the preferred embodiment, as illustrated in FIGS. 1–4, the radially extending projection means 28 includes at least one cone-like projection 30 having a radial projection that increases in radial length with respect to an increasing longitudinal distance from the outer end 22 for a predetermined longitudinal distance and disposed at a predetermined longitudinal distance from the outer end 22. The cone-like projection 30 also is spaced a predetermined distance from the housing 16 by the reduced diameter neck portion 32. The cone-like projection 30 and the reduced diameter neck portion 32 allow insertion of the flexible elongate outer sheath 14 over the external surface of the elongated connector 20 while expanding over the cone-like projection 30 until the sheath 14 necks down to a reduced diameter position adjacent the housing 16 overlying the neck portion 32, so that the radially extending projection means 28 engages an inner surface of the sheath 14 to provide resistance to removal of the sheath 14 from the connector 20. It has been found that a pull-off force of between 25 to 60 pounds is required to remove the sheath 14 from the connector 20 depending on the temperature of the environment. The lower pull-off force of approximately 25 pounds is found to exist in a high temperature environment, and where approximately 50–60 pounds pull-off force is found to exist in a low temperature environment. As used herein, a high temperature environment is defined as being approximately 180° F. and a low temperature environment is defined as being approximately −40° F. The assembly of the flexible drive cable 10 to the connector 20 is achieved by sliding the coupling end 26 through the aperture 24 and pressing the flexible drive cable 10 toward the housing 16 until the outer sheath 14 fully engages over the radially extending projection means 28 and necks down to the fully engaged position.

Figure 6:
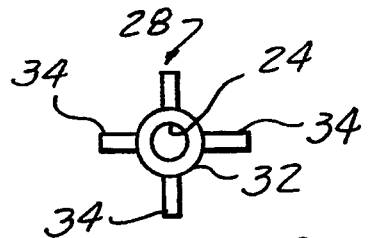
FIG. 6 is a top view of the end fitting shown in FIG. 5.
Figure 3:
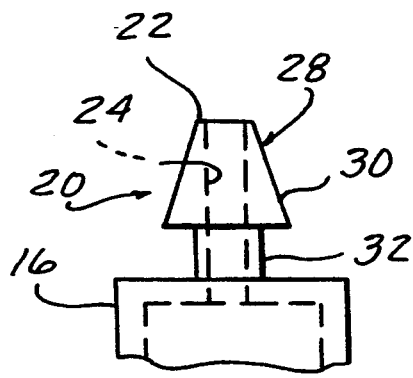
FIG. 3 is a side view of an end fitting according to a first embodiment of the present invention.
Figure 5:
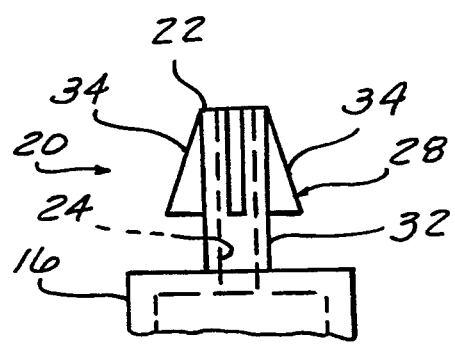
FIG. 5 is a side view of an end fitting according to a second embodiment of the present invention.

In an alternative embodiment, as shown in FIGS. 5 and 6, the radially extending projection means 28 may include at least one barb-like projection 34 allowing insertion of the flexible outer sheath 14 over the elongated connector 20 in the same manner as previously described for the cone-like projection 30. The barb-like projection 34 provides resistance to removal of the flexible outer sheath 14 from the elongated connector 20. The barb-like projection 34 has a radial projection increasing in radial length with respect to an increasing longitudinal distance from the outer end 22 along a predetermined longitudinal length and spaced a predetermined longitudinal distance from the outer end 22 and having a reduced diameter neck portion 32 between the barb-like projection 34 and the housing 16. The barb-like projections 34 may be formed in a two barb configuration as illustrated in cross-section in FIG. 7. Or, in the alternative, a three barb configuration (not shown) may be provided. As illustrated in FIGS. 5 and 6, a four barb-like projection configuration can be formed with each barb equally angularly spaced apart from one another, so that the barb-like projections 34 lie in longitudinal planes disposed normal to one another and can be described generally as longitudinally extending planar cross-sections of the cone-like projection described and illustrated with respect to FIGS. 1–4.

Figure 8:
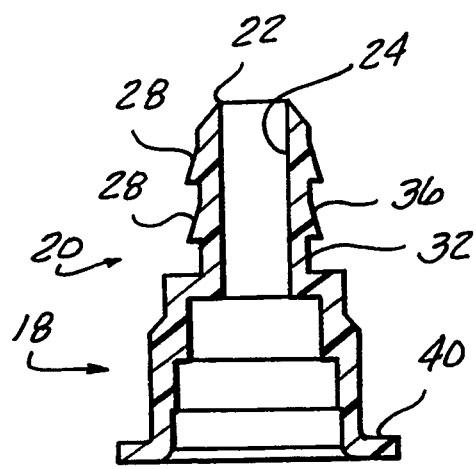
FIG. 8 shows a cross-sectional detail of a plurality of radially extending projection means according to the present invention.
Figure 12:
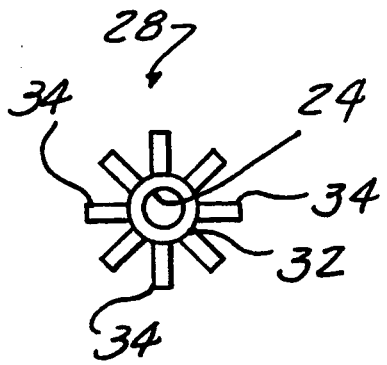
FIG. 12 is a top view of an end fitting having multiple barb-like projections longitudinally spaced from one another and rotated angularly with respect to one another.
Figure 13:
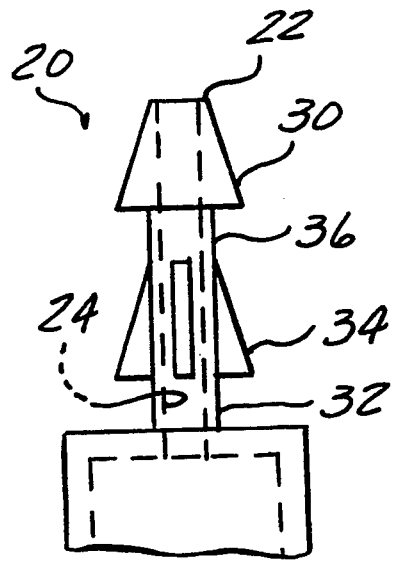
FIG. 13 is a side view of an end fitting having multiple projection means according to the present invention with a cone-like projection disposed adjacent an outer end and a barb-like projection disposed spaced inwardly from the outer end.
Figure 14:
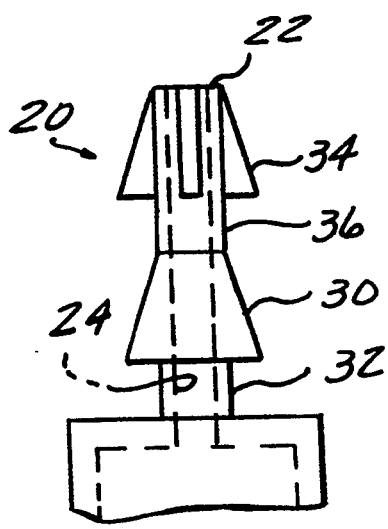
FIG. 14 is a side view of an end fitting according to the present invention with a barb-like projection disposed adjacent the outer end and a cone-like projection disposed spaced inwardly from the outer end.
Figure 11:
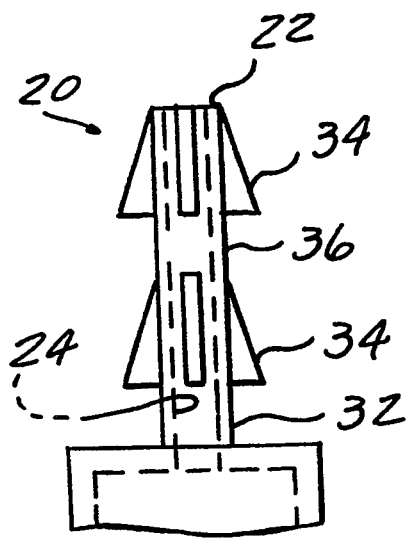
FIG. 11 is a side view of an end fitting having multiple projection means according to the present invention.

Multiple cone-like projections, or barb-like projections can be disposed spaced longitudinally from one another along the longitudinal length of the connector 20 as illustrated in FIG. 8. FIG. 8 is a cross-sectional view of this alternative embodiment of the present invention where a plurality of radially extending projection means 28 are longitudinally spaced along the exterior surface of the connector 20. The cross-section as shown in FIG. 8 can illustrate multiple cone-like projections, where the connector 20 would have a generally lanceolate external appearance with multiple narrow sections and tapering cone-like projections. A narrow or tapered section 36 is formed between the longitudinally spaced radially extending projection means 28. FIG. 11 shows a multiple barb-like projection 34 configuration where two sets of barb-like projections 34 are spaced longitudinally from one another with a narrowed or tapered section 36 disposed in between the two sets of barb-like projections. Of course, it should be recognized that the barb-like projections 34 would not have to be aligned with one another in the same longitudinal plane, but could be rotated angularly with respect to one another so that the sets of barb-like projections longitudinally spaced from one another lie in separate longitudinal planes, as shown in FIG. 12. In addition, FIG. 8 can also depict a cross-sectional configuration of a combination of a cone-like projection and a barb-like projection longitudinally spaced from one another. The cone-like projection can be disposed adjacent the outer end 22 while the barb-like projection is disposed spaced inwardly from the outer end 22 as shown in FIG. 13, or the barb-like projection 34 could be positioned adjacent the outer end 22 while the cone-like projection is disposed spaced inwardly from the outer end 22 as shown in FIG. 14.

Figure 7:
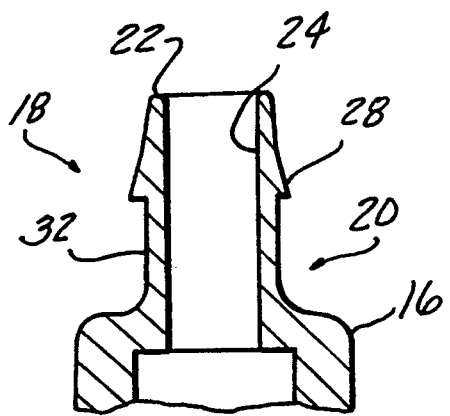
FIG. 7 is a cross-sectional detail showing at least one radially extending projection means according to the present invention.
Figure 9:
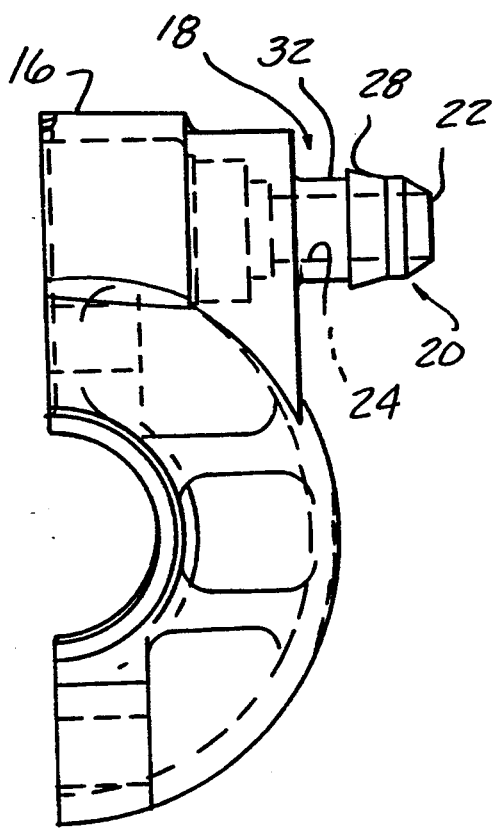
FIG. 9 illustrates an end fitting formed integrally with a housing according to the present invention.
Figure 10:
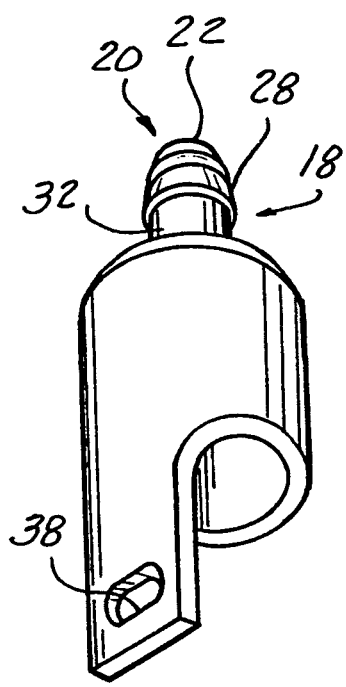
FIG. 10 illustrates an end fitting according to the present invention adapted to be connected to a housing.

Referring to FIGS. 7 and 9, the end fitting 18 according to the present invention may be formed integrally with the housing or fixture 16. The housing 16 and end fitting 18 including elongated connector 20 may be formed of any suitable material, such as metal, plastic or other synthetic materials suitable for the particular application. As illustrated in FIGS. 8 and 10, the end fitting 18 including elongated connector 20 may alternatively be formed separately of the housing or fixture 16. The separate end fitting 18 and elongated connector 20 is adapted for connection to a particular housing or fixture (not shown) by appropriate means, such as aperture 38 shown in FIG. 10 or flange 40 shown in FIG. 8. The end fitting 18 is held stationary in the longitudinal direction when connected to the housing. Of course, it should be recognized that an integral end fitting 18 may be used for the driven element, while a separate end fitting 18 is connected to the motor housing at the opposite end of the flexible drive cable 10 or any combination of the two end fittings as is required under the particular circumstances.

The present invention is particularly well-adapted for use in power-driven automobile seat controls where the use of rotary motion flexible shafts is known. In this particular application, the drive shafts must be capable of almost infinite positioning in a confined space. In some applications, a six-way seat can be driven by one or more motors by using flexible drive cables.

While the invention has been described in detail in connection with rotary elements and transmitting torque between the two rotary elements, it should be understood that the present invention can be adapted for use in connection with flexible drive cable assemblies for connecting two elements in order to enable linear movement to be transmitted between the two elements. A typical application of this nature would be the remote control for an outside automotive side view mirror. Therefore, in its broadest sense, the present invention provides for a flexible drive cable assembly for connecting two elements in order to facilitate relative motion, either rotary or linear, between the two elements.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flexible drive cable assembly for connecting two elements in order to enable movement to be transmitted between said two elements comprising:

a flexible elongate inner drive shaft having a first end and a second end for transmitting movement from said first end of said drive shaft to said second end of said drive shaft;

a flexible elongate outer sheath having coaxial inner and outer surfaces, the outer sheath enclosing a longitudinal length of the inner drive shaft with the inner surface of the outer sheath adjacent to the drive shaft;

a housing enclosing an element to be operably connected to the inner drive shaft; and an end fitting connected to said housing; said end fitting including an elongated connector extending outwardly from said housing to an outer end and having a longitudinally extending aperture for passage of said inner drive shaft, said connector including at least one radially extending projection means for engaging said inner surface of said flexible outer sheath to hold said sheath stationary in a longitudinal direction with respect to said inner drive shaft and housing.

2. The flexible drive cable assembly of claim 1 wherein said at least one radially extending projection means comprises:

at least one cone-like projection having a radial projection increasing in radial length with respect to an increasing longitudinal distance from said outer end for a predetermined longitudinal distance and disposed at a predetermined distance from said outer end, said at least one cone-like projection allowing insertion of said flexible sheath over an external surface of said elongated connector while providing resistance to removal of said flexible sheath from said elongated connector.

3. The flexible drive cable assembly of claim 1 wherein said at least one radially extending projection means comprises:

at least one barb-like projection having a radial projection increasing in radial length with respect to an increasing longitudinal distance from said outer end for a predetermined longitudinal distance and disposed at a predetermined longitudinal distance from the outer end, said at least one barb-like projection allowing insertion of said flexible sheath over an external surface of said connector while providing resistance to removal of said flexible sheath from said elongated connector.

4. The flexible drive cable assembly of claim 3 wherein said at least one barb-like projection comprises at least two barb-like projections disposed radially opposite from one another along a common longitudinal plane with respect to the elongated connector.

5. The flexible drive cable assembly of claim 3 wherein the at least one barb-like projection comprises four barb-like projections disposed equally angularly spaced from one another, such that said four barb-like projections lie in two longitudinal planes disposed perpendicular to one another.

6. The flexible drive cable assembly of claim 1 wherein said at least one radially extending projection means comprises:

first and second radially extending projection means spaced longitudinally from one another along a longitudinal axis of the elongated connector.

7. The flexible drive cable assembly of claim 6 wherein said first radially extending projection means comprises a first cone-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a second cone-like projection having a radial projection increasing in radial length with respect to an increasing longitudinal distance from said outer end along a predetermined distance of the longitudinal length of the connector and spaced longitudinally inward a predetermined distance from the first cone-like projection.

8. The flexible drive cable assembly of claim 6 wherein said first radially extending projection means comprises a barb-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a cone-like projection having a radial projection increasing in radial length with respect to an increasing longitudinal distance from said outer end along a predetermined distance of the longitudinal length of the connector and spaced longitudinally inward a predetermined distance from the barb-like projection.

9. The flexible drive cable assembly of claim 6 wherein said first radially extending projection means comprises a cone-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a barb-like projection having a radial projection increasing in radial length with respect to an increasing longitudinal distance from said outer end along a predetermined distance of the longitudinal length of the connector and spaced longitudinally inward a predetermined distance from the cone-like projection.

10. The flexible drive cable assembly of claim 6 wherein said first radially extending projection means comprises a first barb-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a second barb-like projection having a radial projection increasing in radial length with respect to an increasing longitudinal distance from said outer end along a predetermined distance of the longitudinal length of the connector and spaced longitudinally inward a predetermined distance from the first barb-like projection.

11. The flexible drive cable assembly of claim 10 wherein said first barb-like projection is disposed angularly offset with respect to said second barb-like projection about a longitudinal axis of said elongated connector.

12. A flexible drive cable assembly for connecting a driving rotary shaft to a driven element to enable torque to be transmitted therebetween, said flexible drive cable assembly including a flexible elongate inner drive shaft for transmitting rotational torque, said inner drive shaft sheathed within a flexible elongate outer sheath, said outer sheath connected to an end fitting and disposed stationary in a longitudinal direction with respect to said inner drive shaft, said end fitting comprising:

an elongated connector extending outwardly from said end fitting to an outer end and having a longitudinally extending aperture for passage of a coupling end of said inner drive shaft, said connector including at least one radially extending projection means for engaging an inner surface of said outer sheath to hold said outer sheath stationary in a longitudinal direction with respect to said inner drive shaft and said housing.

13. The flexible drive cable assembly of claim 12 wherein said at least one radially extending projection means comprises:

at least one cone-like projection having a radial projection increasing in radial length with respect to an increasing longitudinal distance from said outer end for a predetermined longitudinal distance and disposed at a predetermined distance from said outer end, said at least one cone-like projection allowing insertion of said flexible sheath over an external surface of said elongated connector while providing resistance to removal of said flexible sheath from said elongated connector.

14. The flexible drive cable assembly of claim 12 wherein said at least one radially extending projection means comprises:

at least one barb-like projection having a radial projection increasing in radial length with respect to an increasing longitudinal distance from said outer end for a predetermined longitudinal distance and disposed at a predetermined longitudinal distance from the outer end, said at least one barb-like projection allowing insertion of said flexible sheath over an external surface of said connector while providing resistance to removal of said flexible sheath from said elongated connector.

15. The flexible drive cable assembly of claim 14 wherein said at least one barb-like projection comprises at least two barb-like projections disposed radially opposite from one another along a common longitudinal plane with respect to the elongated connector.

16. The flexible drive cable assembly of claim 14 wherein the at least one barb-like projection comprises four barb-like projections disposed equally angularly spaced from one another, such that said four barb-like projections lie in two longitudinal planes disposed perpendicular to one another.

17. The flexible drive cable assembly of claim 12 wherein said at least one radially extending projection means comprises:

first and second radially extending projection means spaced longitudinally from one another along a longitudinal axis of the elongated connector.

18. The flexible drive cable assembly of claim wherein said first radially extending projection means comprises a first cone-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a second cone-like projection having a radial projection increasing in radial length with respect to an increasing longitudinal distance from said outer end along a predetermined distance of the longitudinal length of the connector and spaced longitudinally inward a predetermined distance from the first cone-like projection.

19. The flexible drive cable assembly of claim 17 wherein said first radially extending projection means comprises a barb-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a cone-like projection having a radial projection increasing in radial length with respect to an increasing longitudinal distance from said outer end along a predetermined distance of the longitudinal length of the connector and spaced longitudinally inward a predetermined distance from the barb-like projection.

20. The flexible drive cable assembly of claim 17 wherein said first radially extending projection means comprises a cone-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a barb-like projection having a radial projection increasing in radial length with respect to an increasing longitudinal distance from said outer end along a predetermined distance of the longitudinal length of the connector and spaced longitudinally inward a predetermined distance from the cone-like projection.

21. The flexible drive cable assembly of claim 17 wherein said first radially extending projection means comprises a first barb-like projection having a radial projection increasing in radial length with respect to an increasing longitudinal distance from said outer end along a predetermined longitudinal length of said elongated connector and spaced a predetermined distance inwardly from the outer end; and said second radially extending projection means comprises a second barb-like projection having a radial projection increasing in radial length with respect to an increasing longitudinal distance from said outer end along a predetermined distance of the longitudinal length of the connector and spaced longitudinally inward a predetermined distance from the first barb-like projection.

22. The flexible drive cable assembly of claim 21 wherein said first barb-like projection is disposed angularly offset with respect to said second barb-like projection about a longitudinal axis of said elongated connector.

* * * * *

UNITED STATES PATENT AND TRADEMARK OFFICE
CERTIFICATE OF CORRECTION

PATENT NO. : 5,397,270
DATED : March 14, 1995
INVENTOR(S) : Walter B. Pipp, Jr. and Anthony K. Carman It is certified that error appears in the above-indentified patent and that said Letters Patent is hereby corrected as shown below:

Column 9, line 59, after "claim" please insert --17--.

Signed and Sealed this

Sixth Day of June, 1995

Attest:

BRUCE LEHMAN

Attesting Officer

Commissioner of Patents and Trademarks